(12) United States Patent
Bales et al.

(10) Patent No.: US 9,393,620 B2
(45) Date of Patent: Jul. 19, 2016

(54) UBER-COOLED TURBINE SECTION COMPONENT MADE BY ADDITIVE MANUFACTURING

(71) Applicant: United Technologies Corporation, Hartford, CT (US)

(72) Inventors: Daniel A. Bales, Avon, CT (US); Agnes Klucha, Colchester, CT (US); Gregory M. Dolansky, Higganum, CT (US)

(73) Assignee: United Technologies Corporation, Farmington, CT (US)

( * ) Notice: Subject to any disclaimer, the term of this patent is extended or adjusted under 35 U.S.C. 154(b) by 876 days.

(21) Appl. No.: 13/714,561

(22) Filed: Dec. 14, 2012

(65) Prior Publication Data

US 2014/0169981 A1    Jun. 19, 2014

(51) Int. Cl.
| | | |
|---|---|---|
| *B22F 5/04* | (2006.01) | |
| *B33Y 10/00* | (2015.01) | |
| *B22F 3/105* | (2006.01) | |
| *B33Y 30/00* | (2015.01) | |
| *B33Y 80/00* | (2015.01) | |

(52) U.S. Cl.
CPC ............... *B22F 5/04* (2013.01); *B22F 3/1055* (2013.01); *B33Y 10/00* (2014.12); *B33Y 30/00* (2014.12); *B33Y 80/00* (2014.12); *Y02P 10/295* (2015.11); *Y10T 29/49339* (2015.01); *Y10T 29/49341* (2015.01)

(58) Field of Classification Search
CPC ........ B22F 5/04; B22F 3/1055; Y02P 10/295; Y10T 29/49316; Y10T 29/49339; Y10T 29/49341; B33Y 10/10; B33Y 30/00; B33Y 80/00
See application file for complete search history.

(56) References Cited

U.S. PATENT DOCUMENTS

| | | | |
|---|---|---|---|
| 4,318,753 A | * | 3/1982 | Anderson, Jr. ............ C22F 1/10 148/404 |
| 4,514,144 A | | 4/1985 | Lee |
| 4,574,451 A | | 3/1986 | Smashey et al. |
| 4,580,613 A | | 4/1986 | Miller et al. |
| 4,627,480 A | | 12/1986 | Lee |
| 4,753,575 A | | 6/1988 | Levengood et al. |
| 5,275,228 A | | 1/1994 | Wortmann et al. |
| 5,931,638 A | | 8/1999 | Krause et al. |

(Continued)

FOREIGN PATENT DOCUMENTS

| | | | | |
|---|---|---|---|---|
| CN | N1182459 A | | 5/1998 | |
| CN | 101780544 A | | 7/2010 | |
| DE | WO 2011036068 A2 | * | 3/2011 | ............ B22F 3/1055 |

OTHER PUBLICATIONS

The International Search Report mailed Dec. 20, 2013 for International Application No. PCT/US2013/061432.

(Continued)

*Primary Examiner* — Moshe Wilensky
(74) *Attorney, Agent, or Firm* — Kinney & Lange, P.A.

(57) ABSTRACT

A gas turbine airfoil having internal cooling passages is formed by additive manufacturing. Layers of superalloy powder are fused by an energy beam using a two-dimensional pattern providing unmelted areas forming passageways therein. Layers of the powder are added and fused using sufficient two-dimensional patterns to form the entire airfoil with the desired pattern of internal cooling passages. After completion of the formation of the airfoil, it may be hot isostatic pressed, directionally recrystallized, bond coated, and covered with a thermal barrier layer.

17 Claims, 8 Drawing Sheets

(56) References Cited

U.S. PATENT DOCUMENTS

| | | |
|---|---|---|
| 5,985,467 A | 11/1999 | Beele |
| 8,488,994 B2 * | 7/2013 | Hanson .................. G03G 13/00 399/130 |
| 2006/0110256 A1 | 5/2006 | Gigas et al. |
| 2008/0014457 A1 | 1/2008 | Gennaro et al. |
| 2008/0095635 A1 | 4/2008 | Chon |
| 2008/0220177 A1 * | 9/2008 | Hass .................. C23C 14/0021 427/446 |
| 2009/0183850 A1 | 7/2009 | Morrison et al. |
| 2010/0058977 A1 | 3/2010 | Schaadt et al. |
| 2011/0038709 A1 * | 2/2011 | Liang ...................... F01D 5/187 415/115 |
| 2011/0311389 A1 * | 12/2011 | Ryan ...................... B22F 3/1055 419/27 |

OTHER PUBLICATIONS

First Chinese Office Action for Chinese Patent Application No. 201380050210.5, dated Apr. 5, 2016.

Extended European Search Report for European Patent Application No. 13842446.0, dated Jun. 1, 2016.

* cited by examiner

UBER-COOLED TURBINE SECTION COMPONENT MADE BY ADDITIVE MANUFACTURING

CROSS-REFERENCE TO RELATED APPLICATION(S)

This application is related to a commonly owned application filed Sep. 28, 2012 having Ser. No. 13/630,120 with the title UBER-COOLED MULTI-ALLOY INTEGRALLY BLADED ROTOR, the disclosure of which is incorporated herein by reference in its entirety.

BACKGROUND

Cooled cast turbine airfoils and other turbine section components such as blade outer air seals (BOAS) are commonly used in gas turbine engines to enable components to operate at higher gas path temperatures than would be possible with un-cooled configurations. Cast superalloys using conventional techniques such as a casting having ceramic core and/or refractory metal core cooling designs have been effective; however, demand for ever-increasing engine efficiency and reduced fuel consumption continue to challenge conventional turbine airfoil casting technology.

The ability to produce an actively cooled turbine engine airfoil that can operate thousands of hours in a thermal environment where metal temperatures operate less than 200 degrees Fahrenheit of the melting temperature of the superalloy is important. This has been achieved using a combination of cored passages and laser drilled holes and/or electro-discharge machine drilled holes that communicate with one another to provide passageways within the superalloy casting for which cooling air can enter and exit. This enables the superalloy material to retain sufficient mechanical properties to withstand operational induced loads and achieve or exceed part life requirements.

The smallest ceramic core configuration that can be produced with high production yields, (i.e., without fracture during handling, shipping and casting of product) is a shape approximately 0.050 inches (0.02 cm) to 0.025 inches (0.01 cm) in diameter. Ceramic core configurations exhibit what is known in the industry as core shift, which often occurs when the molten metal is poured onto the ceramic core. For that reason, cores can not be placed as close to the surface of the part as would be possible if there were no core. With the passageways distanced from the surface to compensate for core shift, the cooling is less effective.

Refractory metal core technology offers the ability to achieve sizes approaching 0.012 inches (0.005 cm) to 0.010 inches (0.004 cm) in one dimension, but the second or third dimensions will be greater. Refractory metal cores are generally produced from sheet stock, hence the final shape is more rectangular in cross-sectional shape than shapes achieved with ceramic core technology. Core breakage is a concern for ceramic cores, while refractory metal cores have shape limitations.

U.S. Pat. No. 4,753,575 shows airfoils with nested cooling channels where two channels carry separate coolant across the span of the airfoil in adjacent parallel paths. The paths are relatively large. Similarly, U.S. Pat. No. 5,931,638 shows blades or vanes with medial passages for coolant. The disclosures of both of these patents are incorporated herein by reference in their entirety.

SUMMARY

Superalloy turbine section components in gas turbine engines airfoils are formed by a method that includes forming the component by additive manufacturing with internal cooling passages proximate the exterior surface of the component. The formed component may then be subjected to hot isostatic pressing to enhance mechanical properties. It is then directionally recrystallized to introduce a directional grain structure. A bond coat is applied, a thermal barrier coat is put on the bond coat, and the airfoil is then precipitation heat treated to obtain desired mechanical properties.

A method of forming an airfoil having internal cooling passages includes loading of a STL file having slices defining a gas turbine airfoil with internal cooling passages, placing a layer of superalloy powder on a build plate of a fusing unit and directing an energy beam to the powder on the build plate to fuse the powder in the shape of a two-dimensional slice from the STL file. A new layer of powder is added and fused in the shape of a next two-dimensional slice from the STL file, and the process is repeated with additional layers until the airfoil is formed with a plurality of cooling passages filled with un-fused powder. The un-fused powder is removed, leaving the internal cooling passages.

A gas turbine airfoil includes an additive manufacturing formed superalloy body having internal cooling passages with a cross sectional dimension no larger than about 0.015 inches (0.0381 cm).

DETAILED DESCRIPTION

It would be an advantage if superalloy turbine airfoils can be super/hyper cooled, which is termed "uber-cooled" herein, beyond the capability achievable by current cast airfoil production technology. Uber-cooling is defined as cooling caused by air flow in a large number of small holes that are aerodynamically shaped to eliminate obstruction of air flow. Uber-cooling permits operation at temperatures that are within 100° F. (37.8° C.) of the incipient melting temperature of the superalloy being used.

A limitation with any such airfoils with internal passages as described in the above referenced patents is that the surface area of heat transfer capable surfaces is limited, both in the number of passages and in the non aerodynamic shapes of passages that slow down the flow of air therein. Increased surface area would provide better cooling. In addition to superior cooling, it would be desirable to improve the performance of the airfoil, such as improved creep life, thermal mechanical fatigue, creep and tensile ductility of the airfoil.

Figure 1:
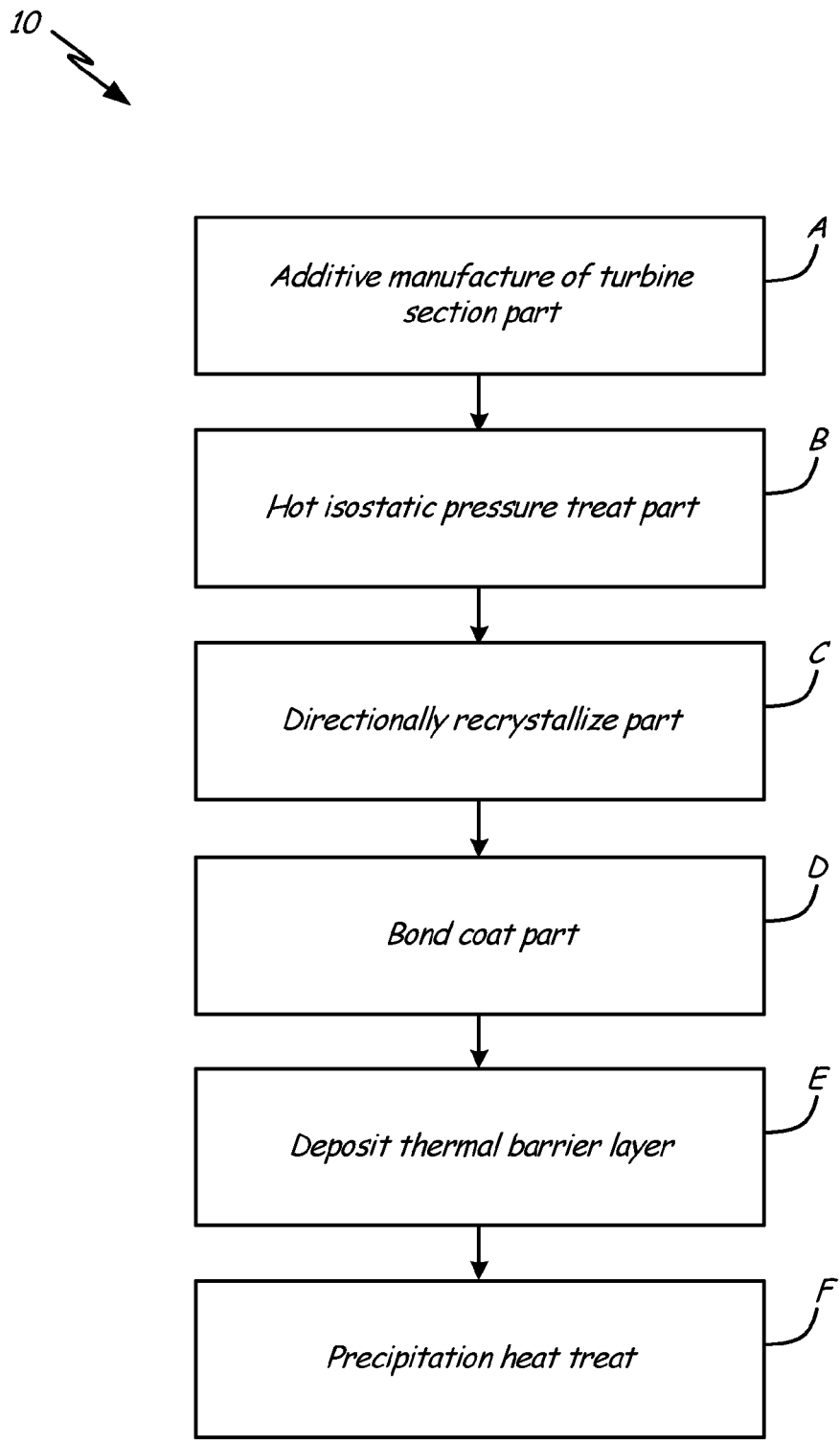
FIG. 1 is a flow diagram of the overall process of this invention.
Figure 2:
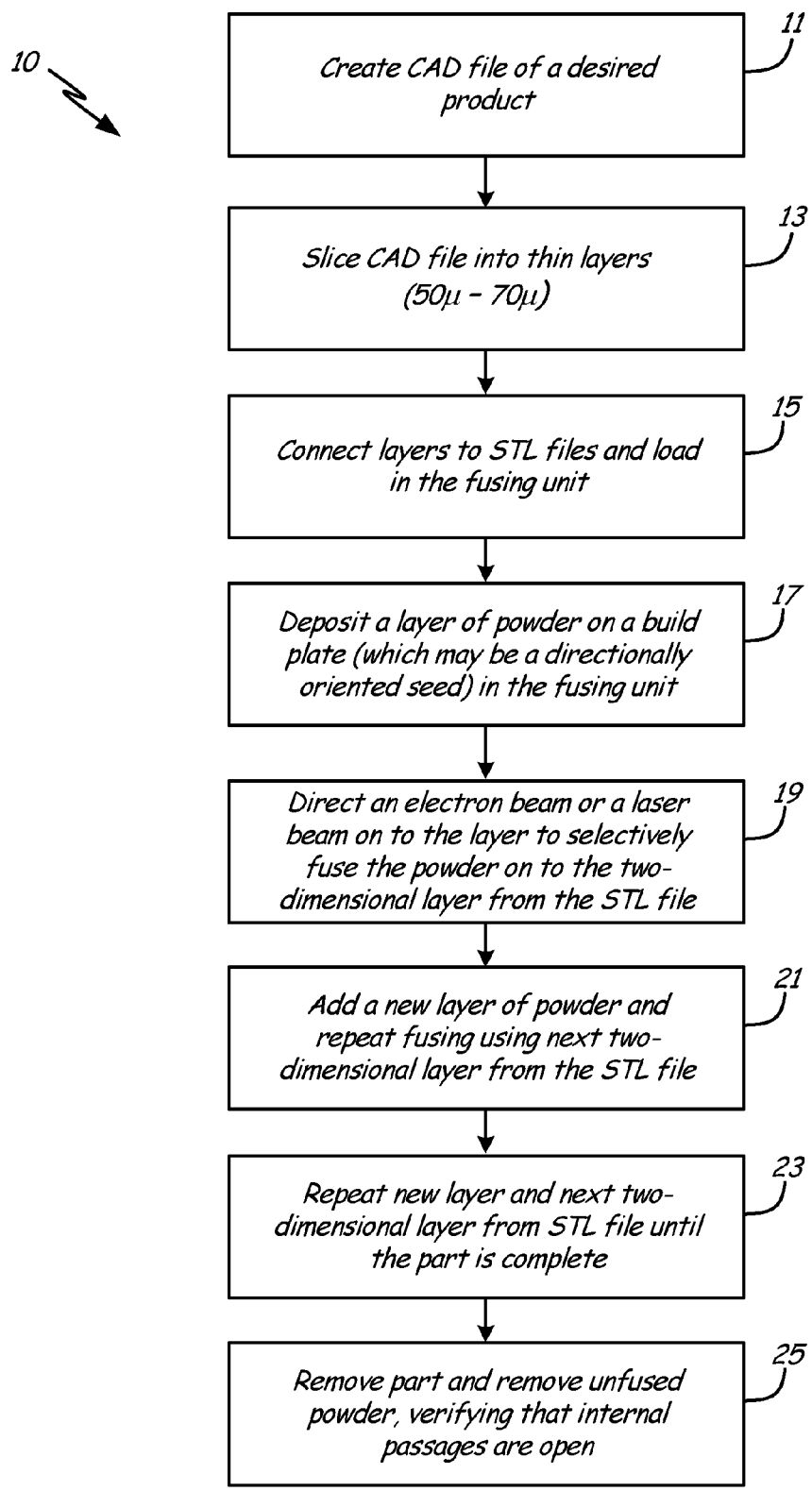
FIG. 2 is a flow diagram of the additive manufacturing process of this invention.

FIG. 1 describes generally how a finished turbine airfoil is formed. The airfoil is formed using additive manufacturing (AM) in step A, described in greater detail below as shown in FIG. 2. Mechanical properties of the airfoil are improved in step B by hot isostatic pressure (HIP) treatment. HIP is a conventional process and is described in detail in ASM Handbook, Volume 7, Powder Metal Technologies and Applications, in, for example, §887, §888, §890 and elsewhere.

Figure 7:
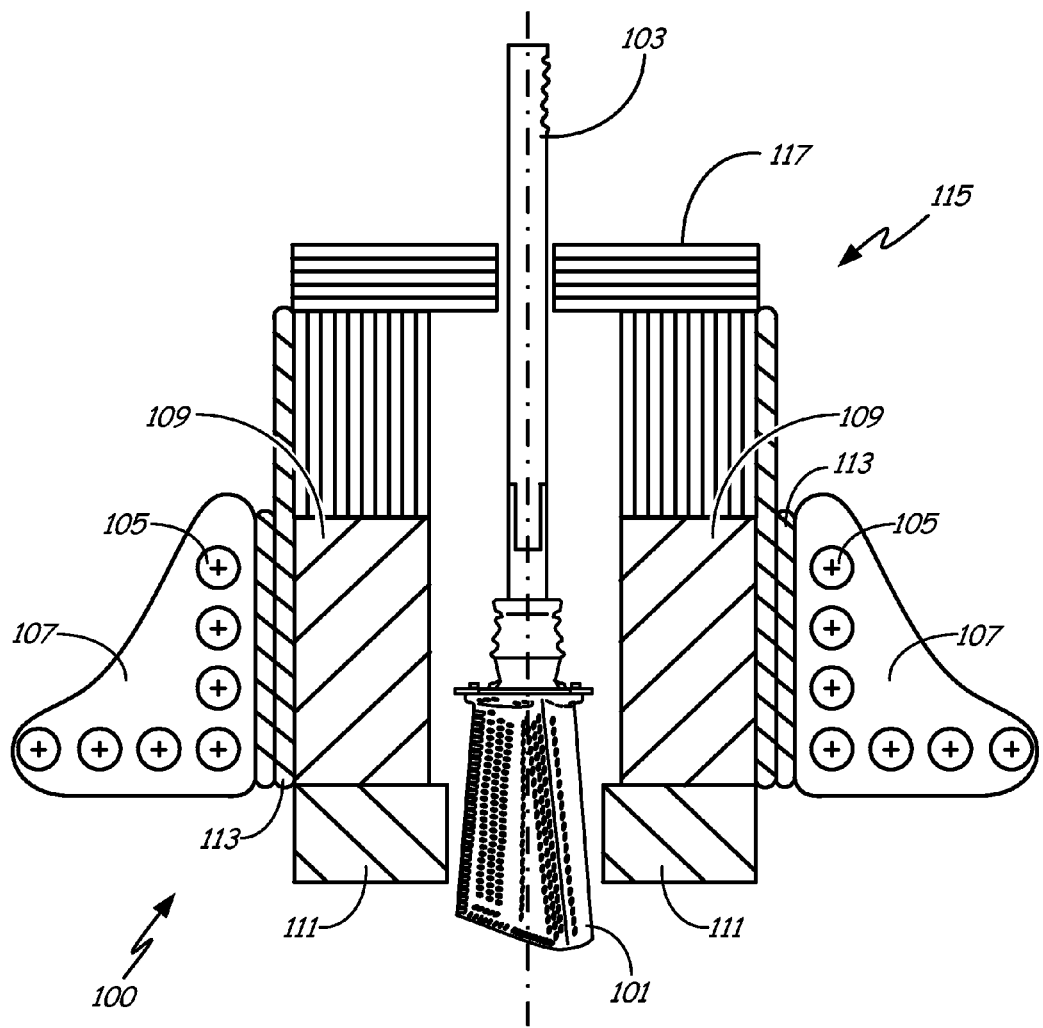
FIG. 7 is a cross section of a directional recrystallization furnace.

The airfoil is then subjected to directional recrystallation in step C, and described in greater detail in FIG. 7. Step D provides for a bond coat, a thermal barrier layer is then added in step E. Steps D and E of course add to the thickness of the airfoil, so the ability to place the passages created in step A much closer to the surface than possible in prior art ceramic core processes is important in providing enhanced cooling of the airfoil. Step F provides for final precipitation heat treatment to achieve desired mechanical properties (e.g., creep, tensile, fatigue, etc.).

FIG. 2 illustrates the AM process 10 used in this invention. A Computer Assisted Drawing (CAD) of a desired turbine component that includes an airfoil (e.g., a blade or vane) is created in step 11. The CAD file is sliced into thin layers of about 50 microns to about 70 microns in step 13.

The CAD file is converted to a stereolithography (STL) file in step 15. STL files are designed to direct the operation by computer of an additive manufacturing (AM) system such as, in this case an electron beam melting (EBM) device or a direct metal laser sintering (DMLS) system.

A single layer of powder such as a superalloy powder having the final chemical composition of the part being manufactured is deposited on a building table of an AM system in step 17. Both DMLS and EBM systems are contemplated for this invention. DMLS employs a laser and can operate on smaller particles than EBM. DMLS generally produces a smoother surface than EBM, but EBM build rates are faster. EBM employs an electron beam. The powder that is deposited on the building table has a diameter of from about 20 microns to about 100 microns. The layer is essentially one powder particle diameter deep.

The AM device, controlled by the STL file, directs a laser beam or an electron beam onto the build layer to fuse (by melting or sintering) that part of the two-dimensional layer in step 19. Powder not contacted by the laser or electron beam is not fused but remains in place. The fused powder forms a solid portion of the final product.

Typically the platform is indexed down by one layer thickness, a new layer of powder is deposited on top, and selective heating is performed using the next two-dimensional layer from the STL file in step 21. As shown in step 23 they layer by layer process is repeated until the part is complete. The part is then removed and un-melted powder is removed in step 25, including verification that the internal passages are open.

The gas turbine part is intended to operate at a substantially elevated temperature. The superalloy that forms the airfoil may have a melting temperature of from about 2350° F. (1287.8° C.) to about 2450° F. (1343.3° C.) and operate for long periods of time at about 2200° F. (1204° C.). Cooling is absolutely necessary. With the ability to create cooling passages in a superalloy airfoil using additive manufacturing, gas turbine engine efficiency is greatly enhanced. The present invention permits the cooling passages to be 3× to 6× closer to the airfoil surface than is possible with conventional ceramic core or refractory metal core casting processes. In addition, the ability to tailor the frequency/stiffness of the airfoil by precise placement of cavities, ribs or other internal structure, which can be done using AM, vibratory stress issues are minimized or eliminated.

Figure 3:
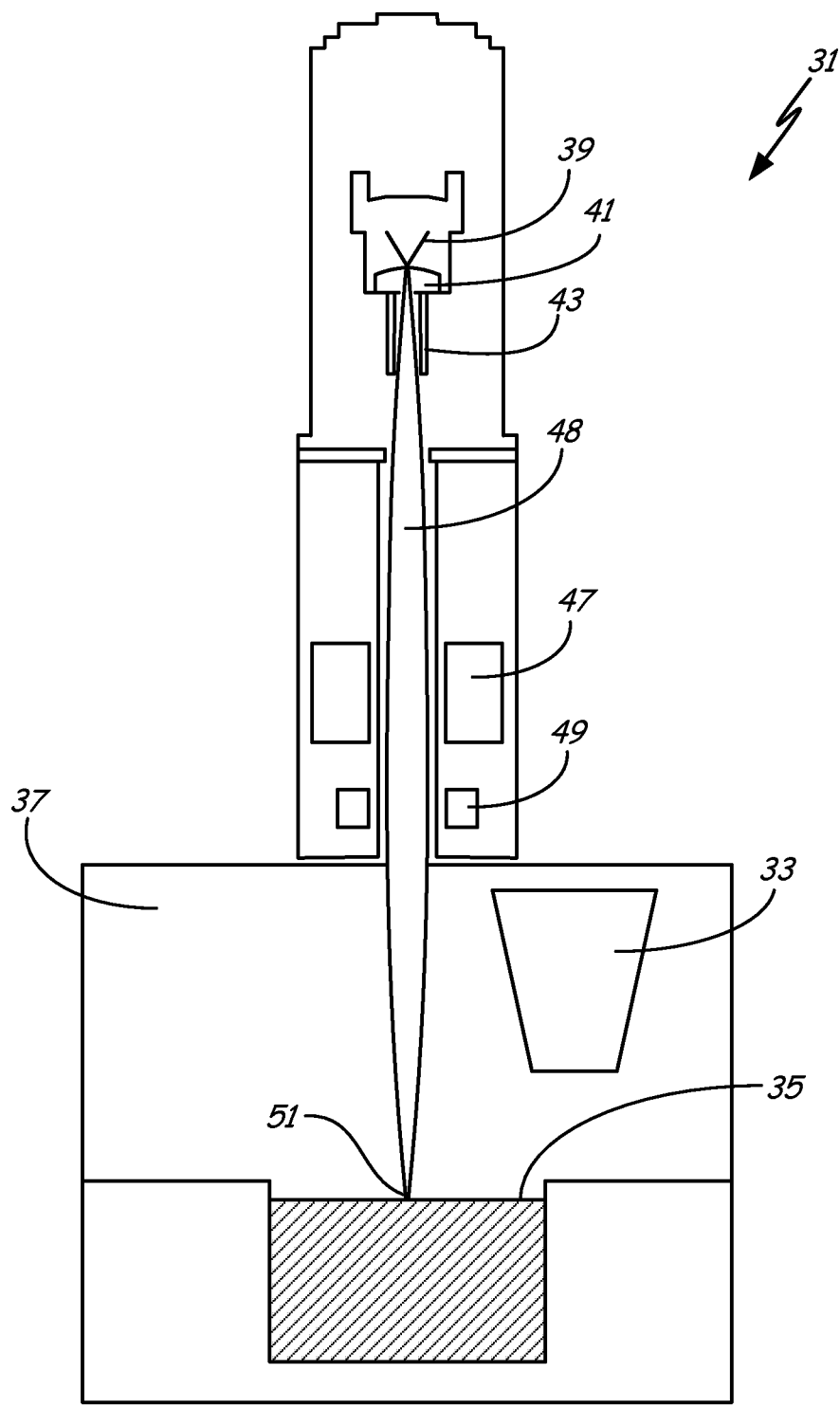
FIG. 3 is a side elevational view of a device used in the process of this invention.

FIG. 3 illustrates AM system 31 used to melt superalloy powder in two-dimensional layers from the STL to form an airfoil with uber-cooling passages. Alloy powder is held in powder supply 33 and powder is deposited on build table 35 in a vacuum chamber 37. Filament 39, grid cup 41 and anode 43 create electron beam 45 which passes through focus coil 47 and is directed by deflection coil 49 to strike selected areas of the powder layer on build table 35 at 51. Beam 45 moves based on the predetermined two-dimensional pattern from the STL file. Once the pattern is complete for one layer, a next layer of powder and a new two-dimensional pattern are subjected to the same treatment until all the patterns have been applied. Build table 35 is designed to be lowered by the thickness of the superalloy powder layer after each pass. As noted above, superalloy powder of composition typically used for a conventionally cast airfoil (whether single crystal or multi-crystal) may have an average diameter of about 20 microns to about 100 microns, though other powder sizes may also be used.

Figure 4:
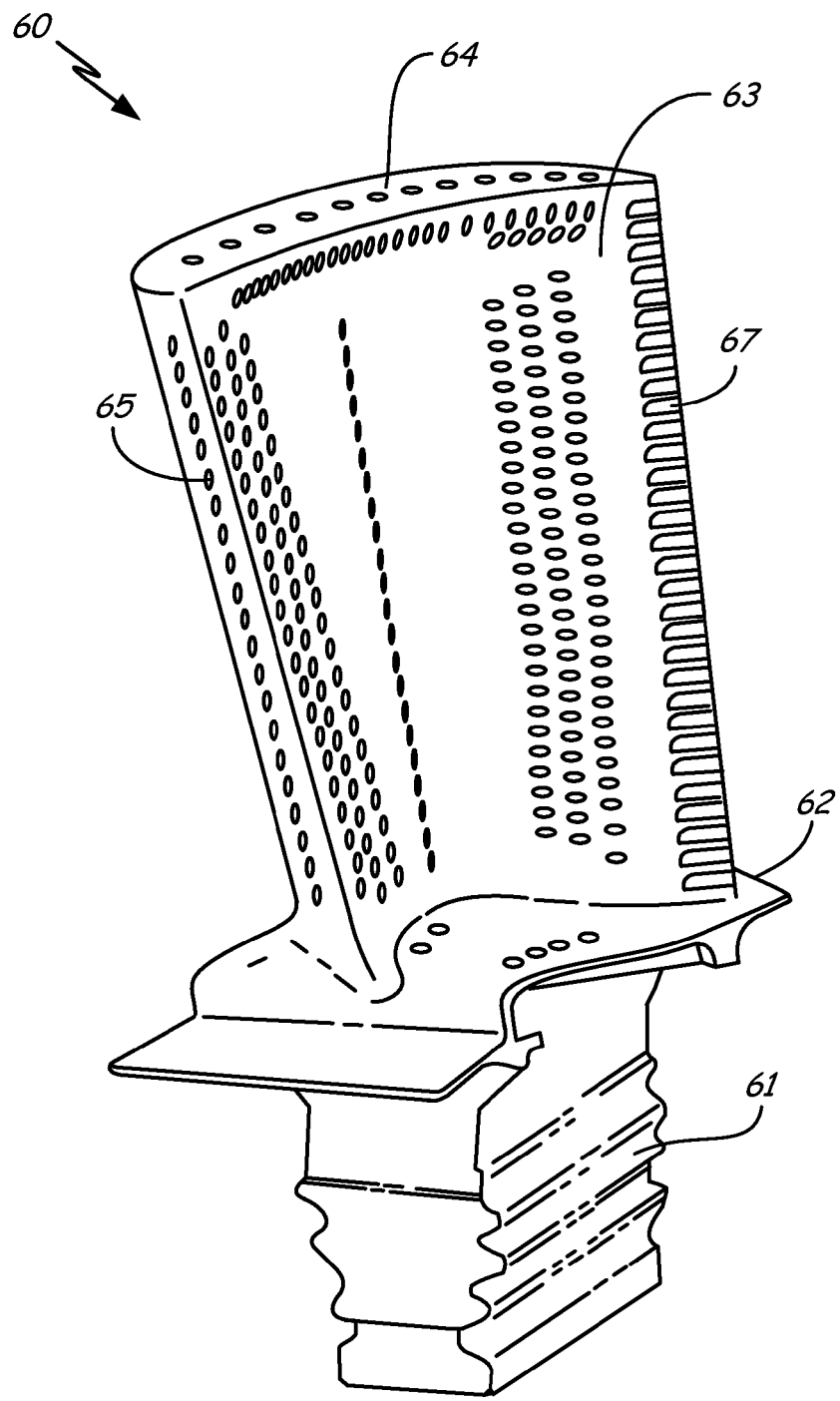
FIG. 4 is a perspective view of the device of this invention.

FIG. 4 illustrates a finished blade 60 for use in a gas turbine engine. Blade 60 includes root 61, platform 62 and airfoil 63. Root 61 is the portion of airfoil 60 that is attached to a rotor. Platform 62 is positioned between root 61 and airfoil 63. Airfoil 63 extends spanwise from platform 62 to airfoil tip 64, and chordwise from leading edge 65 to trailing edge 67. Blade 63 has a plurality of cooling holes, shown but not numbered, on tip 64, leading edge 65, and trailing edge 67 as well as in the pressure and suction side surfaces of airfoil 63. Because the passages are throughout blade 60, including root 61, platform 62 and airfoil 63, cooling takes place at a much more effective rate, allowing use of blade 60 at higher temperatures, thus improving the efficiency of the engine into which it is placed because cooling passages can be placed 3× to 6× closer to the airfoil surface than previously possible using ceramic core or refractory metal core processes. The cooling passages are also shaped to provide less obstructed flow of air since sharp angles in the walls of the passages can be avoided.

Figure 5:
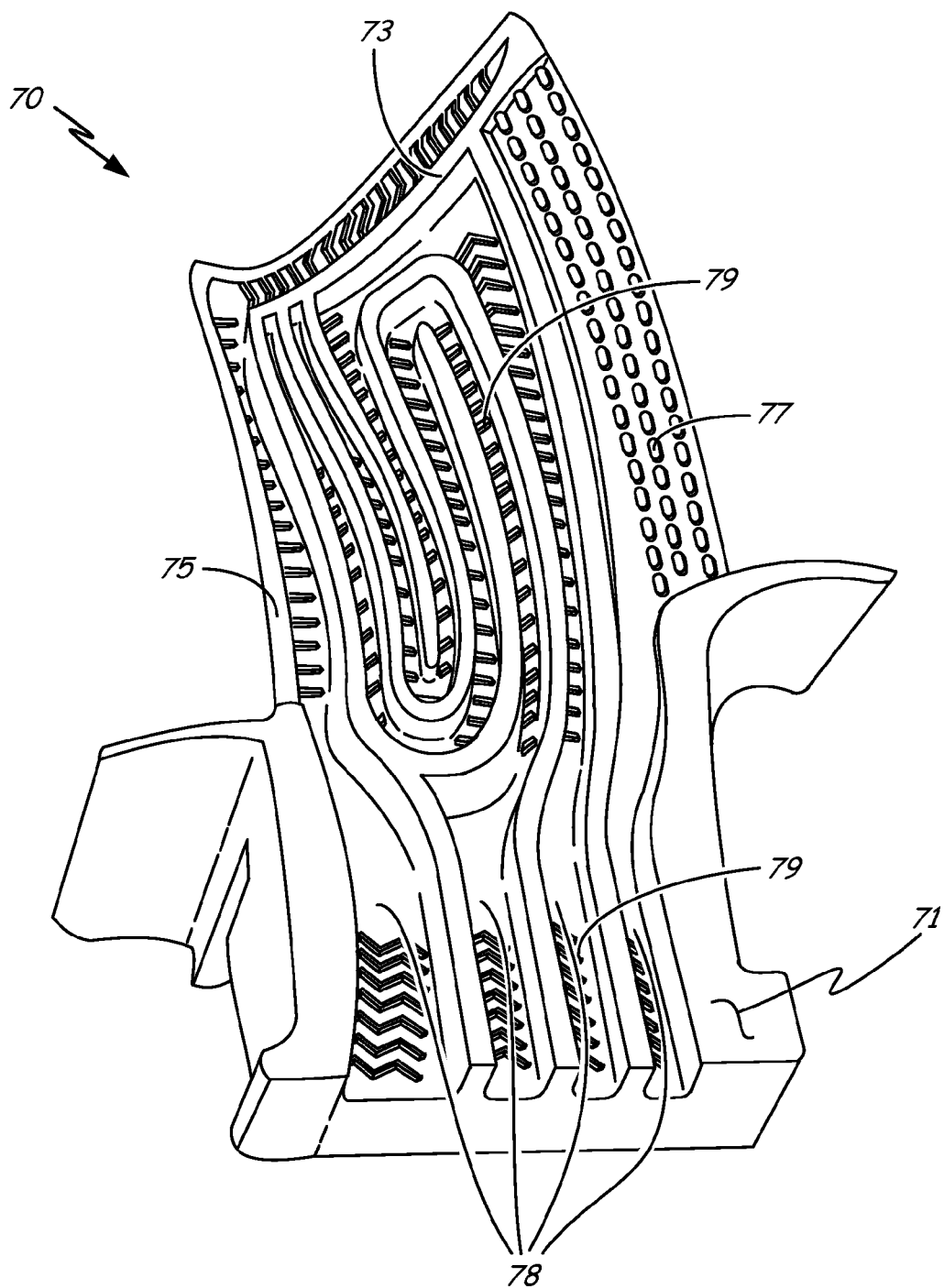
FIG. 5 is a section view in perspective of another device of this invention.

FIG. 5 is a perspective sectional view of airfoil 70 with root 71, blade 73 with leading edge 75 and trailing edge 77. Blade 73 has internal passageways 78 with a plurality of trips 79 that function to slow down the flow of air in passageways 78 to increase the efficiency of the cooling for the reasons stated above. As can be seen, passageways 78 depicted in FIG. 5 would be much closer to leading edge 75 than possible before. Sharp corners are also avoided, making flow of cooling air more uniform and less obstructed.

Figure 6:
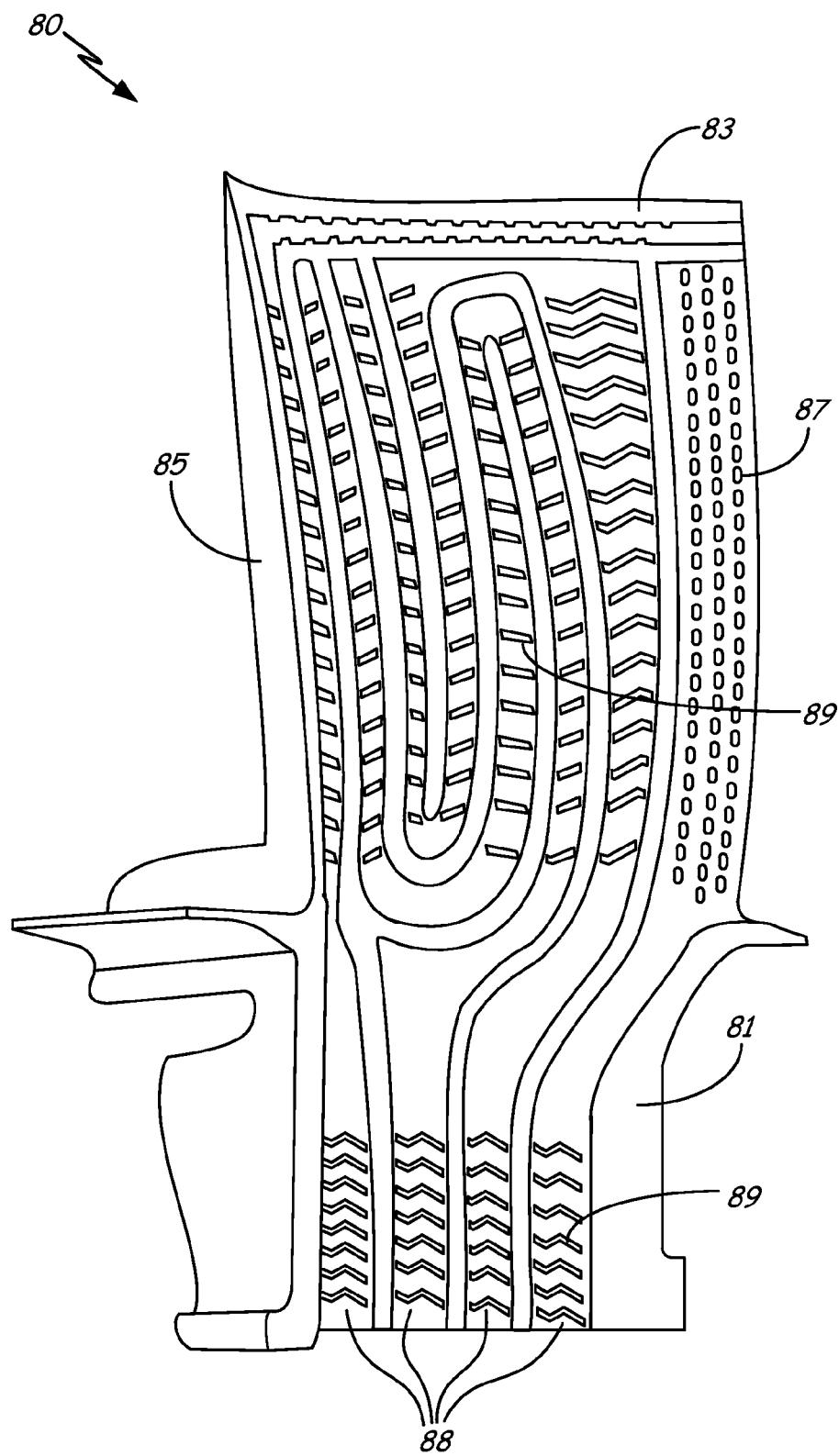
FIG. 6 is a section view of the side of another device of this invention.

FIG. 6 is a side elevation sectional view of airfoil 80 with root 81, blade 83 having leading edge 85 and trailing edge 87. Blade 83 has internal passageways 88 with a plurality of trips 89 to slow down flow of air in passageways 88. Again, cooling passageways 88 are much closer to leading edge 85, as well as the surface of blade 83. Again, sharp corners are avoided. Other configurations of passages and trips are within the scope of this invention, and are selected depending upon the design of the blade.

The turbine blades and vanes of this invention have been found to have an operating temperature that is at least 50° F. (27.5° C.) higher than conventional cast blades and vanes made using ceramic or refractory metal cores because of the superior cooling properties as noted above.

FIG. 7 illustrates a process for modifying the blades and vanes of this invention by directional recrystallization in furnace 100. An equiaxed microstructure may have significantly more than 10,000 grains of the alloy, and after directional recrystallization would preferably have less than 30 directional grains, resulting in substantially improved properties. Blade 101 is attached to drive system rod 103. Heat is generated by induction coils 107 providing electromagnetic energy to susceptor 109, which converts the electromagnetic energy to heat, such as infrared thermal radiation that heats blade 101. Drive rod 103 pulls blade 101 past susceptor 109 with heat shields 111 and 113 preventing heat from escaping down from furnace 100. Drive rod 103 pulls blade 101 at a rate sufficient to cause directional recrystallilzation of blade 101. The rate can be less than ½ inches (1.27 cm) per hour or as fast as 2 inches (5.08 cm) per hour or higher, depending on the alloy being used. Eventually blade 101 reaches the area proximate refractory furnace extension 115 and furnace cap 117.

Figure 8:
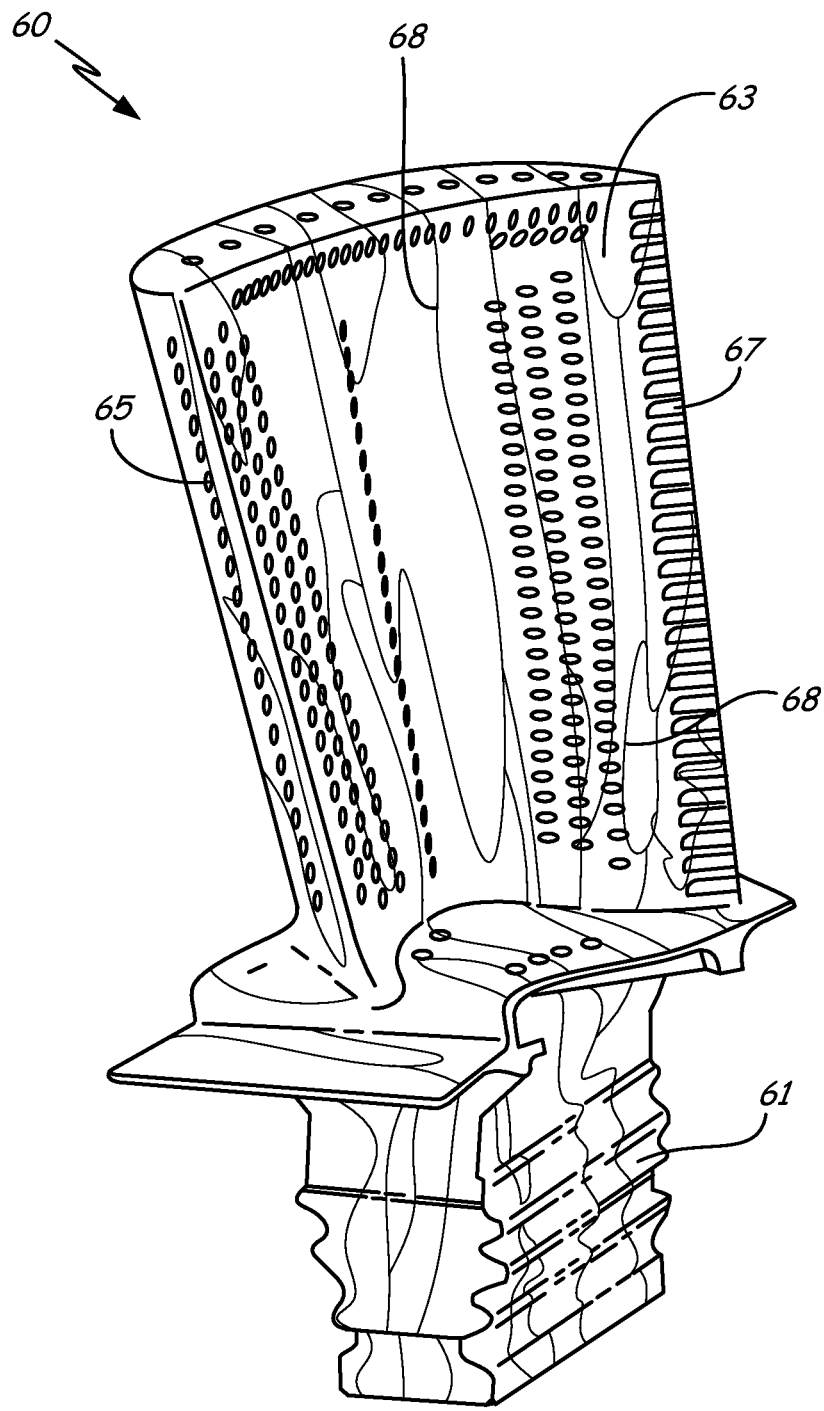
FIG. 8 is a perspective view of the device of this invention showing directional recrystallization of the device.

FIG. 8 illustrates a blade 60 such as that shown in FIG. 3 after directional recrystallilzation in furnace 100. As can be seen, blade 60 contains roughly twenty to thirty grains 68 instead of the 10,000 or more grains without directional recrystallilzation. The resulting airfoil 63 is much improved. Root 61 is the portion of airfoil 63 that is attached to a rotor. Blade 60 has a plurality of holes, shown but not numbered, on leading edge 65 and trailing edge 67 as well as in the body of blade 60.

Airfoils such as blade 60 with internal passages as described above and with directional recrystallilzation are superior to that currently available. The 1400° F. (760° C.) creep life of these blades is over 70 times better, allowing it to operate at up to 150° F. (83.3° C.) higher temperature. The thermal mechanical fatigue of the blades due to having a lower modulus with directionally oriented grains 68 from the blade's root to tip is over fifty times improved, or equivalent to an increase of 300° F. (166.7° C.). Creep and tensile ductility is more than tripled with the directionally oriented grain structure. It should be noted that even without directional recrystallilzation, blades having the passageways described above provide for an operating temperature of greater than 50° F. (27.8° C.) higher temperature for the reasons noted above, such as having cooling passageways 3× to 6× closer to the surface (e.g., within 0.050 inches to 0.010 inches of the surface) of the airfoil created in Step A of FIG. 1 because core tolerances and core shift are not possible since there is no core. Alternatively, it is now possible to downgrade the superalloy to a lower cost material that will function at the desired temperature.

An optional processing step, known as seeding, is a part of the present invention. A single crystal seed having a primary orientation and a secondary orientation can be positioned within the DMLS or EBM build chamber such that an airfoil (or other part configuration) can be created upon the seed crystal to produce a finished product having the same primary orientation and secondary orientation as the seed crystal, the feasibility of which has been shown in U.S. Pat. Nos. 5,900, 170, 5,914,059 and 6,103,402. Alternatively, a seed crystal having a primary orientation and a secondary orientation can be diffusion bonded/brazed onto either end of a completed DMLS or EBM airfoil root or tip and subsequently directionally recrystallized by beginning at the seed and progressing to the opposite end of the airfoil. See FIG. 7.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

DISCUSSION OF POSSIBLE EMBODIMENTS

The following are nonexclusive descriptions of possible embodiments of the present invention.

A method of making a gas turbine airfoil having internal cooling passages includes forming the part by additive manufacturing, treating the part with Hot Isostatic Pressure, directionally recrystallizing the part to impart a directional grain structure. A bond coat and a thermal bond coat are added sequentially to complete the process.

The method of the preceding paragraph can optionally include additionally and/or alternatively, any one or more of the following features, configurations and/or additional components.

The method uses an additive manufacturing system that includes using a STL file in a fusing unit with a build plate and superalloy powder is place one powder diameter thick on the plate and the STL pattern is formed, followed by repeated powder layers also being fused according to the pattern on sequential STL patterns until the airfoil is complete.

A specific additive manufacturing system for this method may be Electron Beam Melting or Direct Metal Laser Sintering.

The STL file of the method is created from a CAD file sliced into thin layers of about 50μ to about 70μ thick.

After the part is formed, the method may include removing the powder and verifying the passages.

The superalloy may be from multi-crystal and single crystal alloy powders.

The method forms passages in the airfoil having a shape selected from at least one of ellipsoidal, serpentine, layered, stacked and labyrinth.

The passages in the airfoil have a diameter no larger than about 0.015 inches (0.0381 cm).

An airfoil has internal cooling passages formed by use of a STL file and a fusing unit fusing a plurality of one superalloy powder thick for the entire STL file, one layer at a time until the airfoil is formed and the un-fused powder is removed.

The airfoil of the preceding paragraph can optionally include additionally and/or alternatively, any one or more of the following features, configurations and/or additional components.

The fusing unit may be Electron Beam Melting or Direct Metal Laser Sintering.

The STL file is formed by converting a CAD file of the airfoil and slicing the CAD file into thin layers, the CAD file thin layers being about 50μ to about 70μ thick.

The airfoil is subjected to directional recrystallization after verifying that the internal passages are open.

The airfoil is formed using a super alloy powder selected from multi-crystal and single crystal powders.

The passages in the airfoil may have a shape selected from at least one of ellipsoidal, serpentine, layered, stacked and labyrinth.

The passages in the airfoil may be washed with an abrasive slurry after verifying the passages are open to reduce surface roughness.

The passages in the airfoil have a diameter no larger than about 0.015 inches (0.0381 cm).

A gas turbine superalloy airfoil has internal cooling passages having a shape selected from at least one of ellipsoidal, serpentine, layered, stacked and labyrinth, and a cross sectional dimension no larger than about 0.015 inches (0.0381 cm).

The airfoil of the preceding paragraph can optionally include additionally and/or alternatively, any one or more of the following features, configurations and/or additional components.

The airfoil is formed from super alloy powder selected from multi-crystal and single crystal powders The airfoil may be directional recrystallized.

The airfoil passageways may contain trips.

The invention claimed is:

1. A method of making a turbine section component of a gas turbine engine, the method comprising:
   forming the component by additive manufacturing using superalloy powder to form the component with internal cooling passages located proximate an exterior surface of the component, at least some of the internal cooling passages within 0.050 inches to 0.010 inches of the exterior surface;
   hot isostatic pressing the part to enhance mechanical properties, producing an initial plurality of grains resulting in an equiaxed grain structure in the part;
   directional recrystallizing the part to introduce a directional grain structure and reduce the initial plurality of grains to a final plurality of directional grains in the part;
   forming a bond coat on the surface; and
   depositing a thermal barrier layer on the bond coat;
   wherein a number of the final plurality of directional grains is less than 30.

2. The method of claim 1, wherein forming the component by additive manufacturing includes:
   loading a STL file into a fusing unit having a build plate, the STL file having slices defining the component with internal cooling passages for air flow therein;
   placing a layer of superalloy powder on the build plate in the fusing unit;
   directing an energy beam to the powder on the build plate to fuse selectively the powder in a shape of a two-dimensional slice from the STL file;
   dropping the build plate by a distance equal to the thickness of one layer; and
   adding a new layer of powder to the existing layer and fusing the powder in the shape of the next two-dimensional slice from the STL file and repeating with additional layers of powder until all the two-dimensional slices from the STL file have been used to form an airfoil in a plurality of layered passageways filled with un-fused powder.

3. The method of claim 2, wherein the fusing unit is selected from an Electron Beam Melting unit and a Direct Metal Laser Sintering unit.

4. The method of claim 2, wherein the STL file is formed by converting a CAD file of the airfoil and slicing the CAD file into thin slices of about 50μ to about 70μ thick.

5. The method of claim 2, which further includes the step of removing unfused powder and verifying that the internal cooling passages are open.

6. The method of claim 1, wherein the superalloy powder is selected from multi-crystal and single crystal powders.

7. The method of claim 1, wherein the internal cooling passages in the airfoil have a shape selected from at least one of ellipsoidal, serpentine, layered, stacked and labyrinth.

8. The method of claim 1, wherein the passages in the component have a diameter no larger than about 0.015 inches (0.0381 cm).

9. A method of forming an airfoil having internal cooling passages, the method comprising:
   loading a STL file into a fusing unit having a build plate, the STL file having slices defining a gas turbine airfoil having internal cooling passages
   placing a layer of superalloy powder on the build plate in the fusing unit;
   directing an energy beam to the powder on the build plate to fuse the powder in the shape of a two-dimensional slice from the STL file;
   adding a new layer of powder to the existing layer and fusing the powder in the shape of a next two-dimensional slice from the STL file and repeating with additional layers of powder until all the two-dimensional slices from the STL file have been used to form the airfoil with a plurality of internal cooling passages filled with un-fused powder; and
   removing un-fused powder from the internal cooling passages; and
   directionally recrystallizing the airfoil after verifying that the internal passages are open, thereby reducing an initial plurality of grains to a final plurality of directional grains in the airfoil;
   wherein a number of the final plurality of directional grains is less than 30.

10. The method of claim 9, wherein the fusing unit is selected from an Electron Beam Melting unit and a Direct Metal Laser Sintering unit.

11. The method of claim 9, wherein the STL file is formed by converting a CAD file of the airfoil and slicing the CAD file into thin slices, the CAD file thin slices being about 50μ to about 70μ thick.

12. The method of claim 9, wherein the superalloy powder is selected from multi-crystal and single crystal powders.

13. The method of claim 9, wherein the passages in the airfoil have a shape selected from at least one of ellipsoidal, serpentine, layered, stacked and labyrinth.

14. The method of claim 9, wherein the passages are washed with an abrasive slurry after verifying the passages are open to reduce surface roughness.

15. The method of claim 9, wherein the passages in the airfoil have a diameter no larger than about 0.015 inches (0.0381 cm).

16. A gas turbine airfoil having internal cooling passages, the airfoil comprising:
   an additive manufacturing superalloy airfoil body having a plurality of internal cooling passages, at least some of the internal cooling passages with a cross sectional dimension no larger than about 0.015 inches (0.0381 cm), and disposed within 0.050 inches to 0.010 inches of the exterior surface;
   wherein the airfoil body is formed of a directional recrystallized superalloy having a final plurality of directional grains;
   wherein a number of the final plurality of directional grains is less than 30.

17. The airfoil of claim 16, wherein the internal cooling passages contain trips.

* * * * *